July 9, 1957

D. C. HUDSON ET AL

2,798,958

APPARATUS FOR PRODUCING RADIOGRAPHS OF SELECTED
STRUCTURES WITHIN A SUBJECT

Filed Jan. 19, 1956

INVENTORS
DONALD C. HUDSON
JOHN W. KUMPULA
BY

ATTORNEYS

July 9, 1957  D. C. HUDSON ET AL  2,798,958
APPARATUS FOR PRODUCING RADIOGRAPHS OF SELECTED
STRUCTURES WITHIN A SUBJECT
Filed Jan. 19, 1956  6 Sheets-Sheet 2

INVENTORS
DONALD C. HUDSON
JOHN W. KUMPULA
BY

ATTORNEYS

July 9, 1957

D. C. HUDSON ET AL 2,798,958

APPARATUS FOR PRODUCING RADIOGRAPHS OF SELECTED
STRUCTURES WITHIN A SUBJECT

Filed Jan. 19, 1956

INVENTORS
DONALD C. HUDSON
JOHN W. KUMPULA
BY
ATTORNEYS

INVENTORS
DONALD C. HUDSON
JOHN W. KUMPULA
BY

ATTORNEYS

Fig.12.

July 9, 1957 D. C. HUDSON ET AL 2,798,958
APPARATUS FOR PRODUCING RADIOGRAPHS OF SELECTED
STRUCTURES WITHIN A SUBJECT
Filed Jan. 19, 1956 6 Sheets-Sheet 6

INVENTORS
DONALD C. HUDSON
JOHN W. KUMPULA
BY
ATTORNEYS

_United States Patent Office_

2,798,958
Patented July 9, 1957

2,798,958

APPARATUS FOR PRODUCING RADIOGRAPHS OF SELECTED STRUCTURES WITHIN A SUBJECT

Donald C. Hudson, Randolph Air Force Base, Tex., and John W. Kumpula, Rockville, Md., assignors to the United States of America as represented by the Secretary of the Army Application January 19, 1956, Serial No. 560,268

8 Claims. (Cl. 250—61.5)

(Granted under Title 35, U. S. Code (1952), sec. 266)

The invention described herein may be manufactured and used by or for the Government for Governmental purposes without the payment of any royalty thereon.

The present invention relates to a device for obtaining radiographic projections of parts located internally of the human body which would be difficult to examine by conventional radiographic methods. More specifically, the invention concerns an apparatus for taking full-mouth dental radiographs using a single film outside the mouth.

A present method includes the use of small films inside the mouth, passing the X-rays through overlying structures, with the result that detail is obscured. Another method, using an extra-oral film, requires that the subject be rotated about an axis through the center of the head, while a film moves in such manner as to intercept X-rays passing through the head from a fixed source and produces a radiograph.

In the instant device, the patient remains in a fixed position and the X-ray apparatus and the single extra-oral film are rotated about the patient, the rate of motion of the film being varied relative to the rate of motion of the X-ray source by a cam mechanism.

Disadvantages of the intra-oral method lie in the fact that placement of films is critical and at the same time uncomfortable to the patient. Furthermore, a number of small films must be used to obtain full-mouth coverage, and many associated structures in the area about the teeth are not readily visualized by this method due to limitations in film size and limited access within the mouth. Extra-oral films as commonly used to diagnose conditions of the bones of the head suffer loss of detail through distortion. This disadvantage is due to the fact that the subject's head must be so oriented that a beam of X-rays can be directed through the structures to be visualized yet pass through a minimum of overlying tissue which would produce shadows tending to obscure detail in the radiograph. Such radiographs are capable of showing detail in comparatively small areas and would require multiple exposures to give coverage of, for example, the entire dentition. A recent radiographic method described in U. S. Patent No. 2,684,446 issued to Y. V. Paatero July 20, 1954, has several disadvantages, a principal one being the fact that the subject's entire body is rotated about an imaginary axis passing through the center of the head. This introduces the problem of placing and holding the entire body in one position and fixing this position throughout the exposure, yet moving the subject's body with respect to the axis of rotation by means of a rotating platform or chair. Another disadvantage lies in the fact that the axis of rotation of the patient is located at the center of the head. Projection of the image of the teeth onto X-ray film using this method, produces distortion and overlapping of adjacent teeth in the radiograph. Shadows cast by the posterior teeth of one side of the mouth also overlay the images of the opposite side which it is desired to visualize, thereby obscuring detail. In order to overcome the inherent disadvantages of present types of equipment used in dental radiography, it is a principal object of the present invention to provide radiographic apparatus for dental examinations comprising an X-ray source and a film both rotatable about a stationary subject which eliminates shadows cast by radiopaque parts overlying the parts desired to be projected, and shortens the time required to obtain clear, detailed radiographs.

It is a further object of the present invention to provide a dental X-ray apparatus wherein the rate of film travel may be varied relative to the rate of travel of the X-ray source about a stationary subject in order that the radiological projections shall occupy a distance on the film equal to the linear distance of curved structures being visualized.

It is a further object of the instant invention to provide a dental X-ray apparatus wherein the X-ray source and the film-carrier are supported by a single member permitting both the X-ray source and the film-carrier to be moved around a stationary patient at a uniform rate of travel, while simultaneously continuously varying the lateral rate of travel of the film to obtain on a single external film a full-mouth dental projection corresponding in length to the internal structures to be visualised.

It is a further object of the instant invention to provide a dental X-ray apparatus wherein the center of rotation of the single supporting member for the radiological source and the film-carrier is coincident with a point on the dental arch.

It is another object of the instant invention to provide a dental X-ray apparatus wherein the radiological source and the film-carrier both travel about a stationary patient.

It is a further object of the present invention to provide a radiological apparatus in which the axis of rotation of the support for the radiological source and the film-carrier may be varied and selected in accordance with the structure to be radiographed.

These and other objects of the instant invention will be apparent from the following description in which—

Essentially, the apparatus comprises a rotatable arm supporting a film-carrier at one end and a radiological source at the opposite end. A plane-surfaced cam having a configuration corresponding to the curvature of the object to be visualized such as a dental arch has its center of rotation coincident with the center of rotation of the movable arm. The cam effects variations in the rate of travel of the film in the film-carrier relative to the rate of travel of the radiological source at the opposite end of the supporting arm as the latter is rotated about a stationary subject. The apparatus may be used to project structures other than the teeth by adjusting the position of the patient relative to the center of rotation of the device. For example, the temporomandibular articulation can be visualized in such manner as to give a detailed radiograph of the structure while eliminating the shadows cast by overlying radiopaque parts which tend to confuse and obscure detail in radiographs taken by conventional methods. It is to be understood that the apparatus, while herein described as applicable to humans, may be used in industrial applications as well as in connection with radiological examination of manufactured articles and objects such as castings, molded articles, gears, and similar objects.

In making dental radiographs, the subject is placed so that the center of rotation of the apparatus falls at a point outside the dental arch on the side opposite the teeth to be visualized. This point is determined as being the center of a circle whose circumference would pass through the molar teeth of the half arch being exposed. Actually, the shape of the dental half arch is a complex curve and not a circle. Compensation for this is accomplished by varying the rate of motion of the film by means of the cam in the film-driving mechanism. This cam produces an increase in the rate of film travel during exposure of the anterior portion of the half arch. The anterior teeth lie outside the circumference of the circle which passes through the molar or posterior teeth. Therefore, the film must move faster when the images of the anterior teeth are being projected so that the linear distance of the half arch being exposed will be projected in true length on the film so that the individual teeth in the exposed half arch will be properly relatively positioned in the radiograph. It is also essential that the film move at a rate slightly greater than the rate at which the X-ray beam sweeps through the structure being visualized if true proportions are to be obtained in the images projected onto the film.

Upon completion of the half-arch exposure on one side, the subject is re-oriented with respect to the center of rotation of the apparatus and the process is repeated. The result is a radiograph of all teeth and bony structures of both upper and lower jaws, presented in two parts but on a single piece of film.

Figure 1:
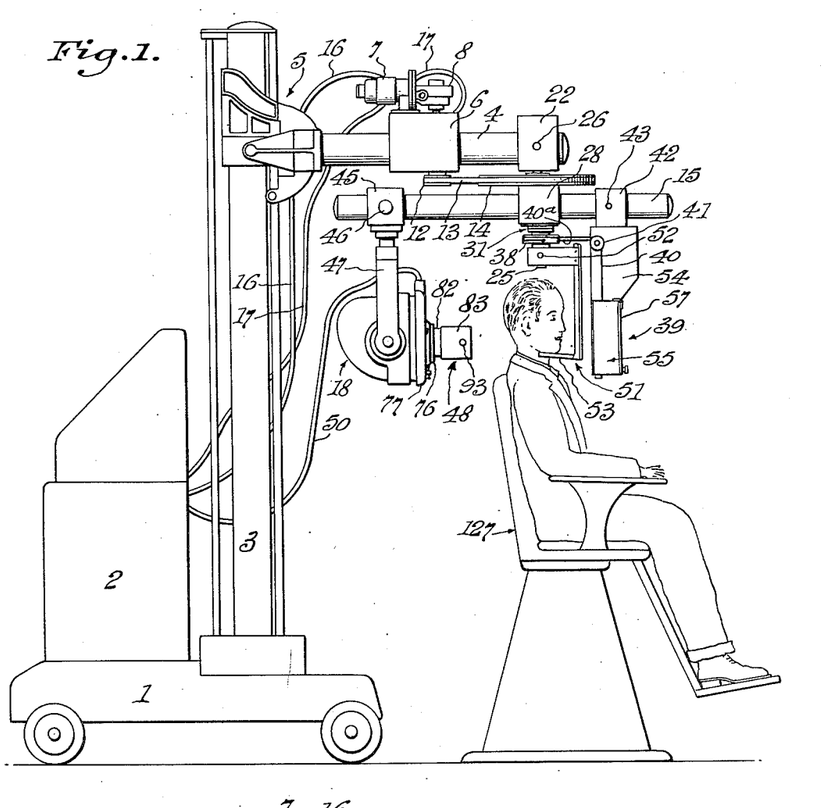
Fig. 1 is an elevational view of one embodiment of the apparatus of the instant invention in position for taking a dental radiograph.
Figure 2:
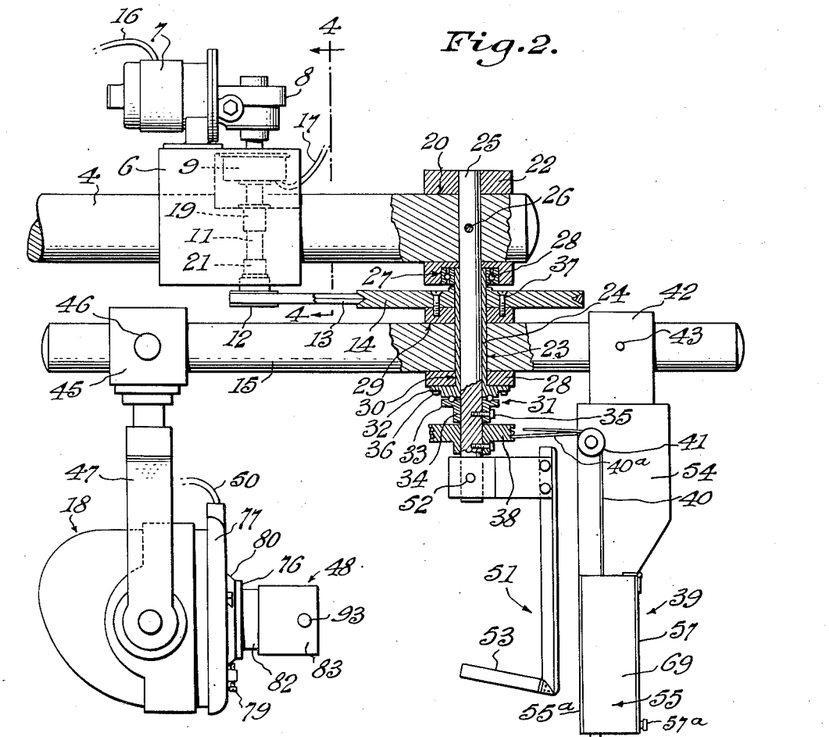
Fig. 2 is an elevational view of the embodiment of Fig. 1 partly in section to show the manner of supporting the rotatable arm from the main boom of the apparatus and the drive mechanism for the rotatable arm and the film-carrier.
Figure 3:
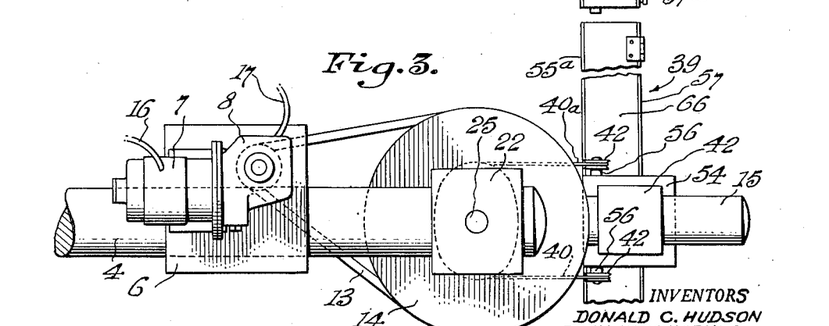
Fig. 3 is a plan view of the drive mechanism for the rotatable arm and film-carrier.
Figure 4:
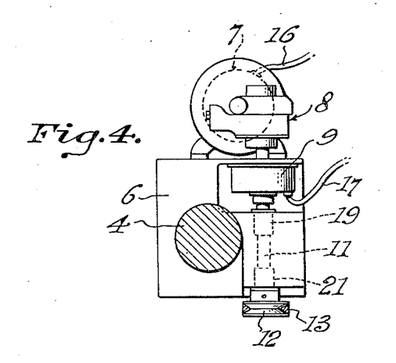
Fig. 4 is a view, partly in section, looking in the direction indicated by line 4—4 on Fig. 2 showing the relative position of the main boom and magnetic clutch of the drive mechanism.

Reference is now made to Fig. 1 illustrating one embodiment of the apparatus. A wheeled base 1 serves as a support for the X-ray and drive mechanism electrical controls housed in the cabinet 2 and a vertical column 3. A boom or arm 4 which may be tubular or solid is carried by the column 3 for vertical sliding engagement therewith by means of the bracket support assembly shown generally at 5. A support 6 slidably carried by the boom 4 has secured thereto a reversible electric motor 7 and reduction gear train 8 which is coupled through a magnetic clutch 9 and shaft 11 to a pulley 12, as more clearly shown in Fig. 4. The position of the power unit comprising the electric motor 7, reduction gear train 8, magnetic clutch 9, shaft 11, and pulley 12 may be varied along the boom 4 as desired. Pulley 12 is connected by a belt 13 to a larger diameter pulley 14 for driving the arm 15. While a belt and pulley arrangement has been described, it is to be understood that other coupling arrangements such as gears or friction drive may be used and the diameters of the pulleys or other coupling mechanism may be varied in ratio to yield any desired speed of rotation of arm 15. Motor 7 and magnetic clutch 9 are energized and controlled from the cabinet 2 through conductors 16 and 17, respectively. The motor, gear train, and magnetic clutch are of conventional structure. Use of the magnetic clutch 9 permits the free motion of the arm 15 when a patient is being positioned, thereby enhancing the flexibility of the apparatus. When power is applied to energize the X-ray apparatus, which is of conventional structure and shown generally at 18, and to the electric motor 7 to drive the apparatus in making exposures, the magnetic clutch 9 couples the output of the motor 7 and gear train 8 to the pulley and belt drive to move the arm 15 as required. The support 6 is devised for mounting on boom 4 so as to permit the shaft 11 connecting the magnetic clutch 9 and pulley 12 to pass to one side of the boom 4, as shown more clearly in Fig. 4. Bushings 19 and 21 position the shaft 11 in the support 6. One suitable arrangement for supporting the arm 15 from the boom 4 and permitting rotation of the arm 15 in a horizontal plane relative to the boom 4 is shown in Fig. 2. A block 22 having a longitudinal bore 20 is carried adjacent the free end of the boom 4. As shown in Fig. 2, the arm 15 has a bore 23 of sufficient diameter to receive a bushing 24 which in turn surrounds a vertical shaft 25, which latter is secured against rotation about its vertical axis by pin 26 passing through the block 22, the shaft 25, and into the boom 4. The shaft 25 extends through the upper wall of the block 22 and is flush with the upper surface thereof, which structure also fixes the block 22 in position on the boom 4. A block 28 bored horizontally and vertically as at 29 and 30, respectively, to permit the arm 15 to pass through horizontally and the bushing 24 and shaft 25 vertically, is maintained in position on arm 15 by the bushing 24 and shaft 25 passing therethrough. The bushing 24 is supported in an upper ballbearing support 28 which is received in a recess 27 on the lower flat surface of the block 22, and a ball thrust bearing, shown generally at 31. The upper plate 32 of the ball thrust bearing 31 is integral with the bushing 24 and is secured to the lower flat surface of the block 28 as at 36, and the lower plate 33 has an integral collar 34 secured to the vertical shaft 25 against rotation thereabout by set screw 35 and to provide a thrust support for the arm 15 and the equipment supported thereby. Pulley 14 is secured by bolts 37, or equivalents, to the upper flat surface of the block 28 and rotates with the bushing 24. A plane-surfaced cam 38 having notches in the periphery thereof is secured to the shaft 25 below the ball thrust bearing 31 and cooperates with the film drive mechanism housed in the film-carrier 39 in a manner to be more fully described hereinafter. The cam 38 is mounted at the center of rotation of the arm 15, and is divided by a longitudinal axis 38a drawn through a major dimension of the cam 38 and normal to the longitudinal axis of arm 15. An axis 38b, drawn normal to the axis 38a and through the midpoint thereof, divides the cam into four lobes or segments. The two lobes on each side of the axis 38b correspond in curvature to the curve of an average adult dental arch. In dental radiography, the cam 38 is oriented with respect to the subject and the dental arch of the subject so that its greater dimension, axis 38a, is at right angles to a line passing anteroposteriorly through the plane of the dental arch. In the instant device for making dental radiographs, the size of the cam 38 has been adjusted to produce the desired rate of film travel with the film passing as close to the face of the subject as is permitted by head contours, nose and ears. Smaller or larger cams may be used in making radiographs of other objects of differing sizes, and cam 38 may be so contoured as to introduce compensating variations in speed of film travel as required by these other objects.

Figure 8:
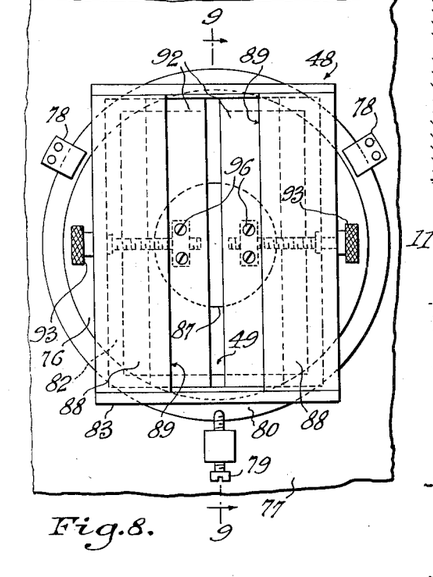
Fig. 8 is a front view of a masking device used in conjunction with the radiological source.
Figure 9:
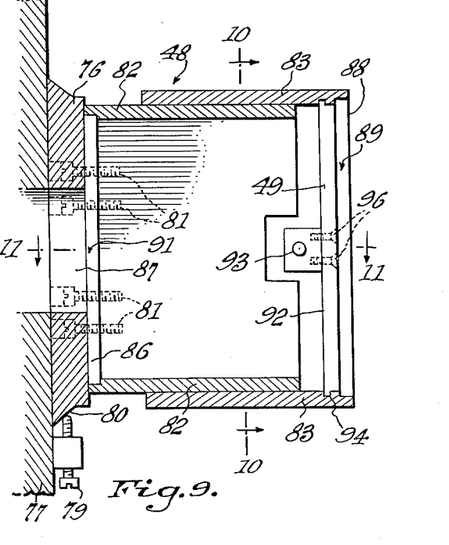
Fig. 9 is a vertical sectional view taken on the line 9—9 of Fig. 8.
Figure 10:
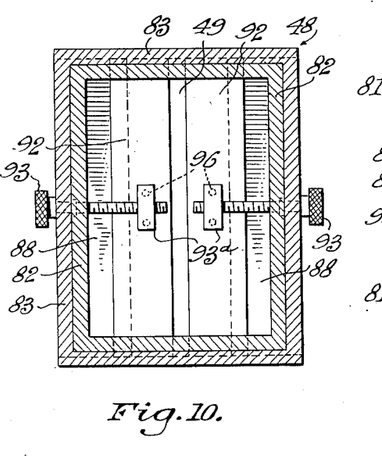
Fig. 10 is a vertical sectional view taken on the line 10—10 of Fig. 9.
Figure 11:
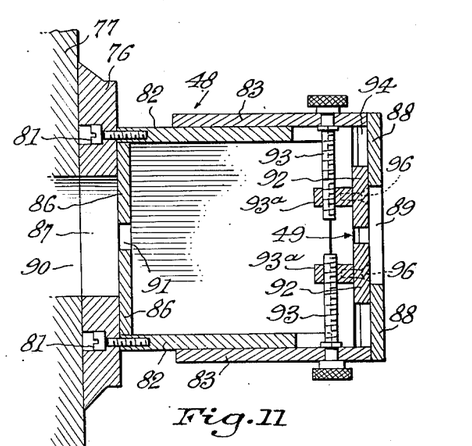
Fig. 11 is a horizontal sectional view taken on the line 11—11 of Fig. 9.
Figure 13:
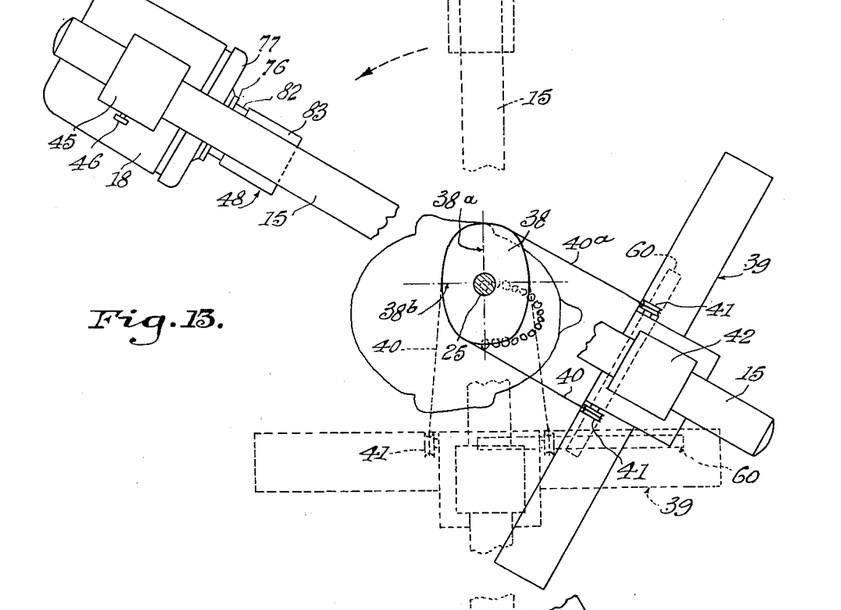
Fig. 13 shows the orientation of the patient relative to the apparatus and the direction of travel of the apparatus when radiographing the right side of the dental arch.
Figure 14:
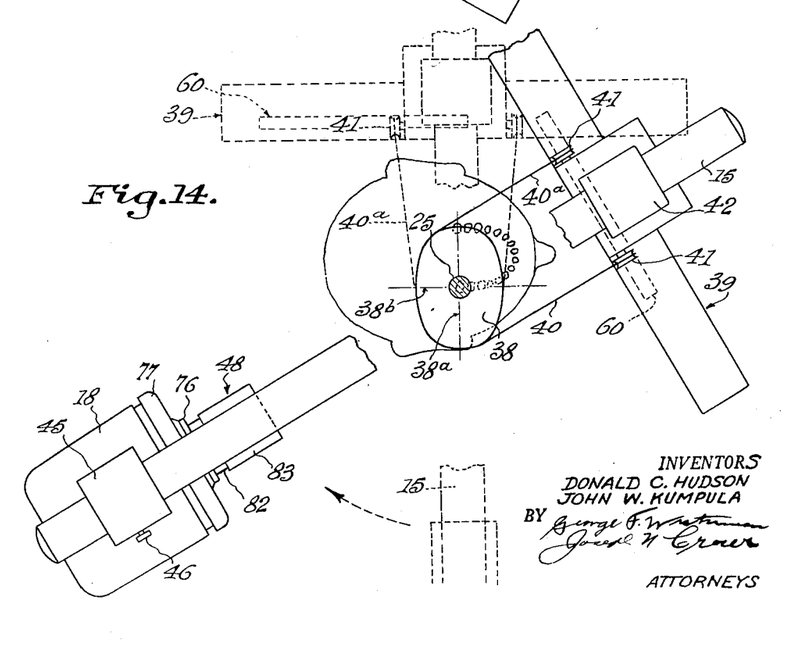
Fig. 14 shows the orientation of the patient relative to the apparatus and the direction of travel when radiographing the left side of the dental arch.

In the application of the instant apparatus to dental radiography, as the arm 15 is rotated, cables 40 and 40*a* pass over stationary cam 38 in the notches thereof and pulleys 41 to a drive mechanism housed in film-carrier 39, as more fully described hereinafter. The contour of the cam 38 produces a slightly faster rate of film travel when radiographing the anterior teeth than when radiographing the posterior teeth. This may be more clearly understood if a particular point is chosen on one of the cables 40 or 40*a*, i. e. where 38*b* intersects the cam edge in Figs. 13 or 14. At this point on the cam edge the lineal velocity is smallest being nearer the center of rotation of the system. As the point chosen progresses to the point of intersection of axis 38*a* with the peripheral edge of the stationary cam, the chosen point on one of the cables 40 or 40*a* will be traveling at a constantly increasing lineal velocity since the distance from the center of rotation is constantly increasing. At the point of intersection of 38*a* with the cam edge, the lineal velocity is maximum. This condition exists for travel of a point on the cables 40, 40*a* over each lobe or quarter of the cam edge. The radius of curvature of each lobe or one-fourth of the cam corresponds to the radius of curvature of one-half the dental arch. It is obvious that as the chosen point passes from the first to the second point, 38*b* to 38*a*, the velocity of the chosen point is constantly changing and consequently so also will the velocity of the object driven by the cables 40, 40*a*, namely, the film-carrier 39 which in the course of its lateral travel will progress at a constantly varying rate of travel. A block 42 having a bore therein is carried by the arm 15, and maintained in fixed position at an end of the arm 15 on one side of the center of rotation thereof by a pin 43. The film-carrier 39 is attached to the block 42 and oriented so that the slit opening 58 in the film-carrier 39 is directed toward the X-ray source 18 which is suspended from an end of arm 15 on the other side of the center of rotation of the arm 15 from the film-carrier 39 by a block 45 slidably engaging the arm 15. The position of the X-ray source 18 may be fixed in any desired position along this portion of the arm 15 by means of the locking screw 46 and may be tilted as desired in a vertical direction in the yoke support 47. Attached to the front end of the X-ray source 18 is a structure shown generally at 48 including a limiting slit 49, shown on Figs. 8, 10, and 11, which is adjustable to provide various widths of the X-ray beam in a vertical plane and will be more fully described hereinafter. A cable 50 connects the X-ray unit 18 to a source of electrical energy which is controlled from the cabinet 2. If tubular members are used for the rotatable arm 15 and boom 4, the cable 50 may be passed through the arm 15 or boom 4 to avoid interference with the motion of the arm 15. A chin support shown generally at 51 is detachably secured in fixed position to the end of vertical shaft 25 by a suitable pin connection 52. The chin support serves as a guide to patient placement and to serve in steadying the patient during dental radiography. Guide lines, not shown, are inscribed on the U-shaped portion 53 of the chin support and are used to orient the patient so that the axis of rotation of the arm 15 is coincident with a point outside the dental arch of the patient on the side opposite the teeth to be visualized. This point is the center of a circle passing through the molar teeth of the half-arch being exposed. In actual practice, satisfactory results are obtained when the center of rotation of the arm 15 is approximately coincident with the last molar tooth of the patient on the side opposite the side being visualized as shown in Figs. 13 and 14. By this procedure the dental arches are placed in a position whereby the teeth will be most accurately reproduced in the radiographs. It is understood that other designs of chin supports yielding the same results may be used without altering the novel results obtained or the operation of the apparatus. When the arm 15 is rotated by pulleys 12, 14, and belt 13, the vertical shaft 25, lower portion of ball thrust bearing 31, cam 38 and chin support 51 remain stationary. A patient being radiographed with the instant apparatus may be seated in a conventional dental chair 127 or may be in a standing position, in which event the apparatus may be raised on the column 3. The patient may also be placed in proper position by means of a movable platform, not shown.

Figures 5, 6, 7:
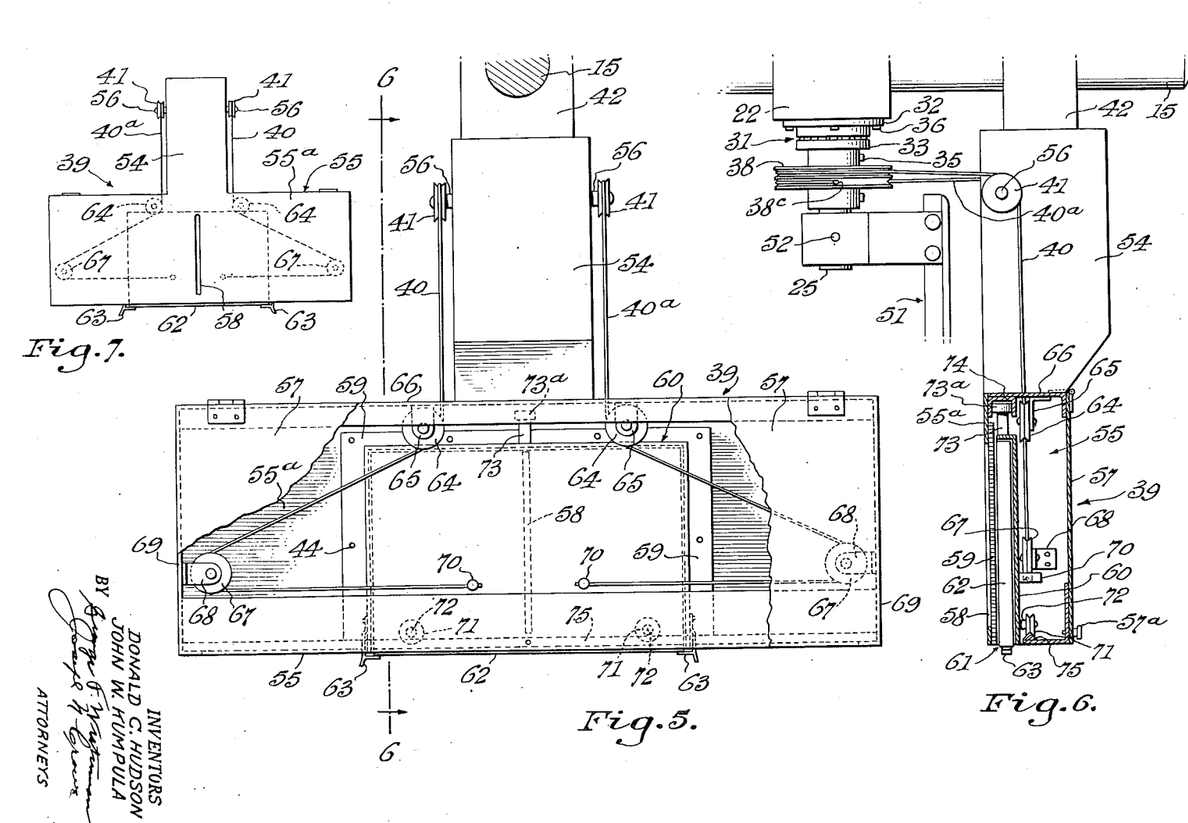
Fig. 5 is a rear elevational view of the film-carrier.
Fig. 6 is an end elevational view, partly in section, looking in the direction of line 6—6 of Fig. 5 and showing the connection between the film-carrier and the mechanism for controlling the variation in rate of travel of the film in the film carrier.
Fig. 7 is a front view of the film-carrier.

Reference is now made to Figs. 5, 6, and 7 showing the film-carrier 39 in detail. The film-carrier 39 comprises an upper support structure 54, which may be of any convenient design, serving only as a support for the lower housing 55 and a place to mount the studs 56 carrying the pulleys 41. The lower housing 55 is provided with an access door 57 held in closed position by a thumb screw 57*a* which engages the housing 55. The front wall 55*a* of the lower housing 55 is made of radiopaque material such as lead and has a vertical slit 58 centrally thereof which is shown to be of fixed dimensions but, if desired, may be made adjustable. A scattered radiation reducing grid 59 is placed behind the slit 58 and secured in any convenient manner as shown at 44 in Fig. 5. This grid 59 is desirable but not necessary and may be of the type well known in the field of radiography, consisting of a system of thin strips or radiopaque material alternating with wider strips of radioparent material so oriented as to permit passage of X-rays directed perpendicularly to the plane of the grid, but preventing passage of X-rays approaching from other directions, as would be the case with secondary radiation or scatter. This grid, when used, is placed over the slit 58 so that the strips of radiopaque material are at right angles to the long dimension of the slit 58 so as to control scatter in the vertical plane. Horizontal scatter is minimized due to confinement of the X-rays emanating from the source 18 to a narrow beam by the action of the adjustable slit 49 on the structure 48 attached to the front end of the X-ray source 18 and masking of stray radiation at the film-carrier 39 by the slit 58. Grid 59 may be placed at slightly more or less than 90° with respect to the long dimension of slit 58, in which case lines will not be produced in the radiograph corresponding to the strips of radiopaque material contained in the grid. The elimination of these so-called "grid lines" from the radiograph may be considered desirable by some radiographers. A cassette housing 60 is centrally located behind the slit 58 within the housing 55 and supported thereby. The cassette housing 60 has an opening 61 at the bottom thereof to permit inserting a radiographic cassette 62 for holding the X-ray film in position when making a radiograph. The cassette 62 which contains intensifying screens and film is a standard commercially available article, which is well known to those skilled in the art, and need not be further described herein. The cassette 62 is inserted through the opening 61 and is held in position in the housing 60 by spring clips 63 secured to the housing 60. A pair of pulleys 64 are mounted by angle brackets 65 secured to the top panel 66 of the housing 55 and another pair of pulleys 67 are mounted by angle brackets 68 secured to the end panels 69 of the housing 55. The cables 40, 40*a* pass over the pairs of pulleys 64 and 67 in turn and the ends of the cables 40, 40*a* are secured at one end in a suitable clamp 70 affixed to the rear wall of the cassette housing 60 and the other end of each cable 40, 40*a* is secured to the cam at points located at diametrically opposite ends of the greater axis 38*a* of the cam 38, as shown for example, at 38*c* in Fig. 6, the fastening point for cable 40*a*. Cable 40 is secured to the cam at a diametrically opposite point. When the flexible cables 40, 40*a* travel over the cam 38, and pairs of pulleys 64 and 67, the film in its cassette 62 is caused to move past the slit 58 at a constantly varying rate determined by the speed of cables 40, 40*a*, which in turn depends upon the speed of rotation of the arm 15 and the contour of cam 38. In the instant apparatus, the rate of travel produces radiographs of average adult dental arches in proper sizes. The rate of travel of the film-carrier 39 has been determined to be slightly greater than the rate at which the beam of X-rays passes through the desired objects and increases as the distance from the objects to the moving film is increased. The film cassette housing 60 is maintained in a steady condition during its travel past the slit 58 by guide rollers 71 carried by studs 72 secured to the rear wall of the cassette housing 60 adjacent the opening 61 in the bottom thereof and a guide pin 73 carrying a roller 73a which projects upwardly from the top of the housing 60 and rides in a channel 74 secured to the top wall of the housing 55. The guide rollers 71 ride on a track 75 which is secured to, or made integral with, the bottom of the housing 55. Other variations for mounting the cassette and steadying it during its travel may be used without departing from the scope of the invention.

The structure 48 for accomplishing variations in the width of the X-ray beam in a vertical plane is shown in detail in Figs. 8, 9, 10, and 11 and includes a circular base member 76, having a central opening 87 therein aligned with the opening 90 in the X-ray housing 77 and detachably secured to the front of the X-ray source housing 77 by locking lugs 78 and a locking screw 79 which engage the sloping face 80 of the base 76. A shield made of radiopaque material, such as lead, is secured to the base 76 by bolts 81 and includes an inner member 82 having rear plates 86 thereof in contact with the base 76 and which telescopically engages an outer member 83 having front plates 88 separated to form an elongated opening 89. The rear plates 86 are separated to form an elongated opening 91. The size of the opening 89 may be varied by means of a pair of lead plates 92 which may be moved laterally by an adjusting screw 93 connected to each one of the lead plates 92 by means of a nut 93a secured to the plates 92 by bolts 96 or in any convenient manner. The adjusting screws 93 are journalled in the vertical sides of the outer member 83. The bottom edges of the plates 92 are constructed to engage a track or groove 94 for steadying the plates when they are moved. By turning the adjusting screws 93, the lead plates 92 can be moved to vary the opening 49 between them and thus control the width of the X-ray beam passing in turn through the openings 90, 87, and 91.

Figure 12:
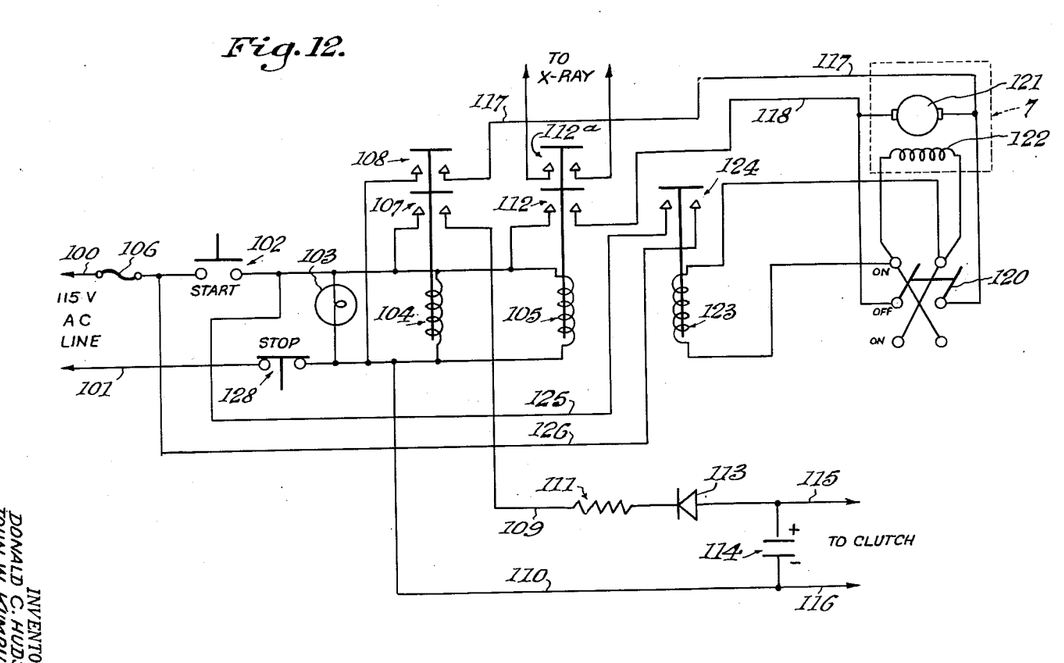
Fig. 12 is a circuit diagram of the electrical components for controlling the drive mechanism for the rotatable member and the X-ray source.

The electrical circuit diagram shown in Fig. 12 shows the relation of the components for controlling the operation of the motor 7 and the clutch 9 which drives the arm 15 when radiographs are being taken. The X-ray source is separately energized but controlled from the same control cabinet 2 which contains the controls for the movement of the arm 15. In place of the conventional X-ray apparatus involving a high-voltage source and a Coolidge type tube, a radiological source deriving its energy from radioactive isotopes, such as radioactive thulium, may be used. When the conductors 100, 101 are connected to a source of alternating voltage and the momentary start button 102 is depressed, the pilot light 103 and relays 104 and 105 are energized. A fuse 106 is connected in one of the leads to the A. C. source. When relay 104 is energized, the A. C. source is connected through the normally open contacts 107 of relay 104 to a rectifier circuit through leads 109, 110, and a dropping resistor 111 which in one embodiment constructed was 150 ohms, 10 watts. The rectifying portion is made up of a rectifier 113 which may be of the diffused junction type such as a 1N153 and an 8 microfarad condenser 114 having proper voltage characteristics both of which are well known to those skilled in the art. The rectifier provides a D. C. source at terminals 115, 116 in the output of the rectifier to the magnetic clutch. Other rectifier arrangements may be used or a direct current source may be connected directly to the magnetic clutch and the rectifier dispensed with. Alternatively, a mechanical clutch mechanism could be substituted for the magnetic clutch. Such modifications are within the ability of one skilled in the art. Simultaneously with the closing of the normally open contacts 107 on relay 104, normally open contacts 108 are closed and connect one side of the A. C. source 101 to lead 117 connected to the armature 121 of the shunt motor 7. Energization of relay 15 completes the connection from the other side of the A. C. source through normally open contacts 112 of relay 105 to lead 118 connected to the other side of the armature 121 of shunt motor 7. Normally open contacts 112a of relay 105 are for controlling the energizing source for the X-ray source 18. The field 122 of shunt motor 7 is shunted across the armature 121 through a double pole double throw limit switch 120 which coacts with and is controlled by the rotation of arm 15 through stops which actuate the switch to "on" and "off" positions as the arm 15 makes its excursions. The center contacts of switch 120 are connected to the A. C. source through leads 117, 118, which in turn are connected directly to the armature 121 of shunt motor 7. Throwing the switch 120 from one side to the other will reverse the field connections to the motor simultaneously shunting the field 121 across the armature 122, to control the direction of rotation of the motor depending upon the side of the dental arch being radiographed. At the neutral position of the switch 120, the field is disconnected from the A. C. source and the motor is stopped. Relay 123 is also energized simultaneously with the field 122 of motor 7 when the switch 120 is thrown to either side. Energization of relay 123 shorts out the momentary start button 102 through leads 125, 126, and completes the circuit to the A. C. source through normally open contacts 124 while the motor 7 is energized by virtue of switch 120 being closed in either direction. A stop button 128 is provided to deenergize the electrical components for rotating the arm 15.

When it is desired to make a dental radiograph using the instant device, the patient is seated in the chair 127 or stands beneath the axis of rotation of the arm 15 facing away from the support column 3. The patient's head is positioned by means of the chin support 51 so that the axis of rotation of arm 15 passes through a point approximately at the angle of the mandible on the right side when radiographing teeth of the left side, and at the angle of the mandible on the left side when radiographing teeth of the right side, or as previously described, the center of rotation is chosen so as to fall at the center of an imaginary circle whose circumference would pass through the crowns of the molar teeth of the side being radiographed. Compensation for the fact that the anterior teeth lie outside such an imaginary circle is provided by the cam 38 as previously described.

The X-ray film is placed in the cassette 62 which is then inserted into the cassette housing 60 and held by spring clips 63. For radiographing the teeth of the right side, the arm 15 is swung so as to place the X-ray source 18 as shown in the broken line position in Fig. 13. The arm 15 may be free-wheeled due to the use of the magnetic clutch structure. The momentary start button 102 is depressed which energizes the magnetic clutch through the rectifier, the armature and the center contacts of limit switch 120. Positioning the arm 15 to make a radiograph throws the switch on in the proper direction to connect the field 122 in shunt with the armature 121 of the motor for rotation of the arm 15 in the desired direction and simultaneously energizes the relay 123 which shorts out the momentary start button 102 to maintain the connection to the A. C. source through contacts 124 on relay 123. The primary control for energizing the X-ray source is on the control cabinet 2, but it is further controlled by contacts 112a on relay 105 to complete a circuit to the X-ray source 18. If a radioactive isotope is used as the source of radiological energy, the high voltage source and the controls therefor obviously may be omitted from the apparatus herein described. Electrical energy will still be required, however, for the motor 7 and magnetic clutch 9 if such substitution is made. In making the radiograph of the teeth on the right side, the arm 15 and its components are moved in a counterclockwise direction by motor 7, gear reduction 8, pulleys 12, 14, and belt 13, sweeping the narrow vertical beam of X-rays issuing from the slit or opening 49 about a center of rotation located, as previously described, through the teeth of the right side of the dental arch with the arm 15 and attached apparatus stopping in the full line position shown in Fig. 13. While the X-ray source 18 at one end of the arm 15 moves by virtue of the rotation of arm 15, the film-carrier 39 at the opposite end of arm 15 also moves in a counterclockwise direction and at the same time the film in the cassette 62 moves past the slit 58 and grid 59 at a constantly varying rate determined by the speed of cables 40, 40a passing over the surface of the fixed cam, which rate is slightly greater than the rate of passage of the X-ray beam through a segment of a circle passing through the teeth being radiographed. Upon completion of the travel of the arm 15 as in Fig. 13, an exposure of the right half of the entire dentition and associated bony structures is obtained. To accomplish the exposure of the other half, left side, the patient's head is repositioned so that the axis of rotation of the arm 15 is at the center of an imaginary circle whose circumference would pass through the crowns of the molar teeth of the left side as in Fig. 14. As previously described, from practical considerations the center of rotation is as shown in Figs. 13 and 14 approximately coincident with the last molar tooth on each side and is located for a patient with the aid of the scribed chin rest. When the patient is oriented, the procedure described above for the right side is repeated for the teeth on the left side, but the arm 15 is rotated as shown in Fig. 14 from the broken line position to the full line position shown. Upon completion of this last phase, a radiograph of the patient's teeth on the right and left sides, upper and lower, including bony structure will result and be on a single piece of film. The half arch exposures require about twenty seconds depending on the size of the arch being radiographed. Placement of the film cassette at the beginning of each half-arch exposure is so arranged that an unexposed space approximately one inch wide is left at the center of the film in which may be printed any desired identifying symbols or information.

Use of the machine for the projection of other structures of the head only requires that a suitable center of rotation be determined and the rate of film travel be adjusted according to the object or structure being visualized. This rate of travel may be obtained through various shapes and sizes of cams.

Having thus described our invention, what we claim as new and wish to secure by Letters Patent is:

1. In an X-ray apparatus comprising a source of radiological energy, film-carrier means for holding film to be activated by said radiological source, rotatable support means carrying said radiological source and said film-carrier means in mutually spaced relation, drive means connected to said rotatable support means, means associated with said rotatable support means for limiting the travel thereof in predetermined arcs, means for moving said film-carrier laterally a predetermined distance, the travel of said rotatable support means in a predetermined arc and the lateral travel of said film-carrier being of equal time duration, a plane-surfaced member having a contoured peripheral edge secured at the center of rotation of said rotatable support means for simultaneous rotation therewith, the peripheral edge of said plane-surfaced member engaging the means for moving said film-carrier whereby rotation of said rotatable support means moves said film-carrier a predetermined lateral distance at a constantly varying rate of travel while said radiological source is being moved simultaneously through a predetermined arc about said center of rotation at a uniform rate of travel when said drive means imparts motion to said rotatable support means.

2. In an X-ray apparatus for radiographing selected structures within a stationary body comprising a source of radiological energy, film-carrier means for holding film to be exposed to said radiological source, rotatable support means carrying said radiological source and said film-carrier means in mutually spaced relation, electromechanical drive means connected to said rotatable support means, electrical circuit interrupting means coacting with said rotatable support means for limiting the travel thereof in predetermined arcs, means for moving said film-carrier laterally a predetermined distance, the travel of said rotatable support means in a predetermined arc and the lateral travel of said film-carrier being of equal time duration, means mounted on said radiological energy source restricting the rays emanating from said radiological energy source to a predetermined pattern, said film-carrier being provided with an opening aligned with said radiological source, grid means mounted in said film-carrier opening for limiting radiation admitted to said film-carrier to rays in a predetermined plane relative to said grid means, a plane-surfaced, horizontally disposed member having a contoured peripheral edge secured at the center of rotation of said rotatable support means for simultaneous rotation therewith, and means secured at the center of rotation of said rotable support means for positioning a body to be radiographed, the peripheral edge of said plane-surfaced member engaging the means for moving said film-carrier relative to said opening and imparting motion to said film-carrier at a constantly varying rate of travel over a predetermined lateral distance while said radiological source is being moved simultaneously through a predetermined arc about said center of rotation at a uniform rate of travel when said drive means imparts motion to said rotatable support means.

3. Apparatus for radiographing selected structures within a stationary body comprising a portable base including a vertical support carrying a vertically slidable horizontal boom, a shaft secured against rotational movement to said horizontal boom and having the longitudinal axis thereof vertically disposed, an elongated member mounted on said shaft for free horizontal rotation thereabout, drive means carried by said horizontal boom, means carried by said shaft and secured in fixed relation to said elongated member for engaging said drive means and imparting rotation to said elongated member in predetermined arcs about a center of rotation coincident with the longitudinal axis of said shaft, a radiological source slidably carried on said elongated member, a housing for enclosing a laterally movable film-carrier supported in fixed position on said elongated arm, said radiological source and said housing being mutually spaced along said elongated member on opposite sides of said center of rotation, means for energizing said radiological source carried on said portable base, means suspended from said shaft for supporting a body to be radiographed, an oval plane-surfaced cam fixedly secured to said shaft and oriented with the greatest axis thereof normal to the longitudinal axis of said elongated member, the peripheral edge of said oval plane-surfaced cam being divided into a plurality of contoured portions of corresponding radius of curvature, the extent of each such contoured portion being defined by the intersection of the greatest axis of said oval plane-surfaced cam with the periphery thereof and the intersection of a minor axis with the periphery of said oval plane-surfaced cam, said minor axis being normal to the greatest axis and passing through the midpoint of said greatest axis, said contoured portions corresponding in arcuate configuration to the peripheral arcuate configuration of the structure within the stationary body being radiographed, electrical circuit interrupting means coacting with said elongated member for controlling the travel of said elongated member in predetermined arcs about said center of rotation, and cable drive means connected to said film-carrier and engaging the peripheral edge of said oval plane-surfaced cam for imparting lateral motion to said film-carrier, the travel of said elongated member in a predetermined arc and the lateral travel of said film-carrier being of equal time duration, rotation of said elongated member by said drive means causing said cable means to travel over the peripheral edge of said oval plane-surfaced cam at a constantly varying rate simultaneously with the predetermined arcuate travel of said elongated member, whereby said film-carrier travels in a lateral direction at a correspondingly varying rate of travel independent of the rate of travel of said radiological source about said center of rotation of said elongated member.

4. Apparatus as recited in claim 3 wherein said cam is divided by the intersection of the greatest and minor axes into four equal areas, the peripheral edge of each area corresponding in contour to a portion of the peripheral edge of the structure within the stationary body being radiographed.

5. Apparatus as recited in claim 3 wherein said minor axis divides said oval plane-surfaced cam into equal areas having a common base line, each area having a peripheral edge contoured to correspond to the arcuate configuration of the peripheral edge of the structure within the stationary body being radiographed.

6. An X-ray apparatus for radiographing structures within a stationary body comprising a rotatable elongated member, support means for suspending said rotatable elongated member for horizontal rotation about a fixed center of rotation, electro-mechanical drive means carried by said support means and connected to said rotatable elongated member, a radiological source slidably carried on said elongated member in spaced relation to said fixed center of rotation, film-carrier means fixedly secured to said elongated member in spaced relation to said fixed center of rotation and facing said radiological source, means for energizing said radiological source, adjustable means for controlling a radiation pattern emanating from said radiological source, means mounted on said film-carrier means for controlling the radiation pattern activating the film in said film-carrier, means for supporting said stationary body, electrical circuit interrupting means coacting with said elongated member controlling the travel of said elongated member in predetermined arcs, a plane-surfaced member fixedly secured to said support means having a peripheral edge contour corresponding in curvature to the peripheral curvature of the structure within said stationary body, and means connected to said film-carrier means and engaging the peripheral contoured edge of said plane-surfaced member for moving said film-carrier laterally at a varying rate of travel dependent upon the curvature of the peripheral edge of said plane-surfaced member while said radiological source is rotated about said center of rotation at a uniform rate of travel upon rotation of said elongated member by said drive means, the travel of said elongated member in a predetermined arc and the lateral travel of said film-carrier being of equal time duration.

7. Apparatus as recited in claim 6 wherein said adjustable means for controlling the radiation pattern emanating from said radiological source comprises inner and outer telescopically arranged members, said inner and outer members each having a base portion and upstanding sides, said inner and outer members when in assembled condition being concentrically arranged relative to the opening in said radiological source, said base portions having openings centrally arranged and aligned with the opening in said radiological source, the base portion of said outer member having an opening of fixed dimensions formed by mutually spaced coplanar fixed panel sections, and means for reducing the size of the fixed opening formed by said fixed coplanar mutually spaced panel sections.

8. Apparatus as recited in claim 7 wherein said means for reducing the size of opening formed by said fixed panel sections comprises a pair of slidable coplanar panels located rearwardly of and contacting said fixed panel sections and adjustable means for selecting a predetermined spacing between said slidable panels for reducing the size of opening between said fixed panel sections.

References Cited in the file of this patent

UNITED STATES PATENTS

| | | |
|---|---|---|
| 1,909,118 | Raab | May 16, 1933 |
| 2,128,655 | Linke et al. | Aug. 30, 1938 |
| 2,476,776 | Smathers | July 19, 1949 |